United States Patent [19]
Clark et al.

[11] 4,124,848
[45] Nov. 7, 1978

[54] RANGE LIMITED AREA PROTECTION SYSTEM

[75] Inventors: Robert V. Clark, Bethesda; Francis X. Linder, Lanham Hills; William R. Taylor, Bethesda, all of Md.

[73] Assignee: Automation Industries, Inc., Silver Spring, Md.

[21] Appl. No.: 835,392

[22] Filed: Sep. 21, 1977

[51] Int. Cl.² .......................... G08B 13/18; G01S 9/24
[52] U.S. Cl. .................................... 340/524; 340/552; 343/14
[58] Field of Search .............................. 343/5 PD, 14; 340/258 B

[56] References Cited
U.S. PATENT DOCUMENTS

| | | | |
|---|---|---|---|
| 3,466,652 | 9/1969 | Heyser | 343/14 |
| 3,657,738 | 4/1972 | Carpentier et al. | 343/14 X |
| 3,882,495 | 5/1975 | Bolger | 343/5 PD |
| 3,932,871 | 1/1976 | Foote | 343/5 PD |
| 3,967,283 | 6/1976 | Clark et al. | 343/5 PDX |

*Primary Examiner*—T.H. Tubbesing
*Attorney, Agent, or Firm*—Jones, Tullar & Cooper

[57] ABSTRACT

A system for detecting intruder motion in selectable zones of a defined area is disclosed. The system is principally used as a line protector to detect intruders in the vicinity of a fence or wall and may be used as a virtual fence by employing a narrow-beam antenna and deep range coverage to detect an intruder crossing its line of sight. The system utilizes a transmitter for periodically sweeping the area to be protected and a receiver incorporating a narrow band filter which is variable to select a plurality of overlapping zones within the protected area, the presence of a reflective target in a selected zone resulting in a corresponding output signal. Means are provided to store such output signals from each zone and to compare received signals with previously-stored signals to detect differences in the target pattern of each zone. Differences exceeding a predetermined threshold level produce event signals which may result in a rescanning of the same zone, the system producing a zone trip signal only if an event is detected in a rescan. Upon completion of a complete scan of all zones, the system responds to selected alarm criteria to produce an alarm indication if there has been a preselected change in the target pattern.

16 Claims, 9 Drawing Figures

RANGE LIMITED AREA PROTECTION SYSTEM

BACKGROUND OF THE INVENTION

This application relates, in general, to surveillance devices, and more particularly to electromagnetic systems for detecting intruders within an area to be protected, which system is capable of maintaining a high degree of sensitivity with high reliability against false alarms.

This application is related to, and is an improvement over, the motion detecting system described in U.S. Pat. No. 3,967,283, which is an intrusion detector that is designed to provide surveillance over large areas. The present invention retains many of the features of the earlier patent, but also includes means for restricting the response of the intrusion detector to a closely defined series of overlapping range zones which permit the system to operate with greatly improved signal-to-noise ratio, improving sensitivity, and reducing false alarm rates while still covering large areas. In addition, use of narrow beam antenna permits the system to be used as a line protector, as opposed to a large area protector, so that it can be used as a virtual fence which will detect the presence of intruders in a narrow, elongated area.

As was set forth in the aforementioned U.S. Pat. No. 3,967,283, intrusion detectors which utilize electromagnetic or acoustic signals to detect moving objects within the field defined by the transmitted signals are well known, a variety of systems having been developed over the years. However, such systems have tended to be overly complex and thus extremely expensive, and in certain cases even the more complex systems have been incapable of providing the type of protection required. Although U.S. Pat. No. 3,967,283 provided an improved system for surveying an enclosed area of a specified maximum range and included means for eliminating specific target responses to prevent interference from targets outside the area being protected as well as from dynamic clutter within the area being protected, even this system has its limitations, for in some circumstances it was found that the large area of protection provided by the patented device did not meet the requirements of certain surveillance applications. For example, if it were desired to protect an aircraft standing on a runway, the large area motion sensor could do so, but would at the same time prevent desired activity, such as repair and maintenance work, from being carried on at the same time. Thus, the system described in the aforementioned patent detected and responded to desired activity as well as undesired activity.

Another difficulty with prior systems such as that disclosed in the aforesaid U.S. Pat. No. 3,967,283 was the fact that when a large area is being covered by a surveillance system and the system responds to the existence of an intruder, there is no way to determine where the intrusion occurred. Where a very large area is being protected, this failure to provide an exact location can result in some difficulties, if not danger.

SUMMARY OF THE INVENTION

It was, accordingly, an object of the present invention to provide an intrusion detecting system which would be capable of protecting a desired area from intrusion while at the same time being unresponsive to desired activities carried on within the area being protected.

It was a further object of the invention to provide a system which would respond not to a large area, but to a very specifically defined, selectable area that would permit the system to be used in the nature of a fence or wall, whereby activities within the area being protected would not trigger an alarm, but wherein motion of an intruder across the line defined by the system would trigger an alarm.

A further object of the invention was the provision of a line type intrusion detector having range capabilities which enabled the system to quickly and accurately identify the exact location of an intruder.

Another object of the invention was to provide a system which, upon the occurrence of a signal indicating the presence of an intruder, would automatically rescan the area previously covered to determine whether the event which caused the signal still existed, whereby transients and the like would be eliminated to reduce false alarms while retaining the sensitivity of the system.

Briefly, the present system comprises a microwave transducer driven by a transmitter which is swept in frequency by a sawtooth wave to provide a variable frequency signal output from the transducer. Reflected waves from targets in the field of the antenna are received and mixed with the output of the transmitter oscillator to produce, after demodulation, an audio frequency complex wave comprising an ensemble of tones of various frequencies, the frequency of each component of the wave being proportional to the range of the particular reflective target which produced that component. A preamplifier and preemphasis filter is provided to equalize the strength of target returns over the range covered by the system so that the amplitude of each component is proportional to the radar cross-section of the target which produced it. The equalized tone signals are fed to a selectively variable filter of four or more stages which is digitally controlled to vary the bandwidth center frequency to which the system responds. In the preferred embodiment, the filter may be varied to respond sequentially to selected ones of 16 distinct frequency bands which correspond to the frequency of audio signals derived from the receiver in response to reflections from targets at corresponding range zones spaced from the transducer. As the band frequency for the filter is varied, the Q, or reciprocal bandwidth, of the filter is also changed so that the adjacent range zones overlap to provide a continuous coverage of the area to be protected. The filter is also varied to compensate for changes in gain that would otherwise accompany changes in Q, and thus each stage of the filter is equivalent to a parallel-resonant circuit and an adjustable-gain amplifier. The filter has a narrow band of response to provide an increased signal-to-noise ratio and increased sensitivity, while the digital tuning of the filter permits rapid scanning of the area to be protected while retaining this high signal-to-noise ratio.

The output from the filter is a complex wave made up of a plurality of tone signals having frequencies which correspond to the range of targets within the selected range zone, with the amplitudes of the signals being proportional to the size of the corresponding targets. Means are provided to convert this complex range signal to digital form for sampling, storage and subsequent comparison with a later received signal from the same zone, to determine whether there has been any motion of a target within the zone. This comparison is accomplished by feeding the output of the filter through a voltage controlled oscillator (VCO), the output of which is a signal having an instantaneous frequency proportional to the amplitude of the input. The VCO output is fed to a counter which counts the total number of oscillator cycles during a predetermined time interval to produce a count proportional to the average applied voltage during this interval. The counter is stopped, read and reset periodically to take a plurality of samples, for example, 8, of the filter output during a single sweep of the transmitter frequency. In normal operation, the filter is switched from one zone to the next between each sweep of the transmitter, and the area being protected is divided into 16 zones so that at the end of one cycle of operation, or scan of the area being protected, each of the range zones has been selected by the filter, and the output of the filter has been sampled 8 times for each range zone.

The counter produces, in the example, eight 8-bit binary words for each zone, and this information is stored in corresponding zone locations within the memory of a suitable microprocessor. Thus, the processor contains eight binary words to "describe" the target content of each of the 16 range zones.

During each subsequent transmitter sweep of each zone, means are provided for comparing newly acquired samples representing the target content of that zone with the previously stored samples on a word-by-word basis to determine whether there have been any changes in target content. This comparison produces output error signals proportional to any detected change and these error signals are used to produce alarm signals when the errors meet preselected criteria. In order to reduce false alarms caused by minor changes in the target configuration within a zone, a threshold level is established that requires at least a predetermined number of error signals to produce an event signal which may be used to indicate an alarm condition. False alarms are further reduced by providing means responsive to the occurrence of an event signal to prevent shifting of the filter to the next range zone, so that the next following sweep covers the zone which produced the threshold level error signals. If the event signal turns up again in this second sweep, then a zone trip condition is produced; if no event signal shows up in the second sweep, the filter switch is again inhibited to produce a third sweep of the same zone and if this third sweep produces the same threshold error signals, a zone trip is indicated. If the third sweep does not produce an event, the zone trip circuit is reset, and the filter is switched to the next range zone. Thus, if threshold error signals are detected, one or two resweeps of that range zone are required, with two out of the three sweeps producing error counts above the threshold, before a zone trip occurs. This eliminates false alarms caused by short transient events.

At the end of a complete scan of the area being protected, the system compares the zone trip conditions of the several range zones, as well as various error counts, with predetermined and selectable alarm criteria to determine whether the zone trip pattern, or the changing pattern over a period of time, corresponds to the pattern that would be produced by an intruder into the area. If the pattern corresponds to the selected criteria, an alarm condition is produced.

As a protection against false alarms, the alarm criteria for the system are carefully selected in accordance with the geometry of the space being protected, the direction of motion anticipated, the expected size of the intruder, and the like. For example, the selected criterion may require an indication of an alarm condition in two or more adjacent zones before an alarm signal is actually produced. This eliminates false alarms caused by targets of small radar cross section, such as birds or rodents. Another criterion may involve the total number of errors accummulated in the system over a single scan or a selected number of scans, and this use of error totals permits a reduction in false alarms caused by transients. The preferred form of the invention incorporates an error history memory in which the error signals obtained from the most recent 4 sweeps of each of the 16 zones are stored. This storage of the error history permits comparison of a current error with a selected prior error signal so that the nature of transient-induced error signals can be determined and criteria established for producing alarm indications only in certain circumstances. Thus, for example, false alarms due to long-term transients can be eliminated by producing an alarm when an error signal is produced in the first and the fourth sweep, only, or the like. In addition, in the preferred embodiment an error sum memory is provided in which is stored the sum of the errors for the most recent 4 sweeps in each of the 16 range zones. This memory permits display of an accummulated error for each zone and permits an alarm indication if the total error over the period of time represented by the 4 sweeps exceeds a predetermined threshold.

The system may include means to analyze the magnitude of the error signal counts in each of the adjacent zones where an alarm is indicated to determine which of the zones has the largest error. This largest error will normally occur in the zone where the intruder target is located, thereby permitting a very accurate location of the intruder. The system further provides a variety of display indicators which are responsive to alarm conditions in the various zones to provide visual indications of the specific locations of intrusion targets, to permit display of the accummulated error in selected zones for test purposes, or for visual identification of a specific zone where a target intrusion has occurred.

The use of a microprocessor facilitates the operation of the system described above, and permits easy selection and variation of various alarm criteria. The microprocessor also provides a central control for the various circuits in the system, whereby appropriate synchronization of the counters, sweep generators, and the like, are easily provided. However, the system may also be hard wired to produce the desired operation, if desired.

BRIEF DESCRIPTION OF THE DRAWINGS

The foregoing and additional objects, features, and advantages of the present invention will become evident to those of skill in the art from a consideration of the following detailed description of a preferred form of the invention, taken in conjunction with the accompanying drawings, in which.

BRIEF DESCRIPTION OF A PREFERRED EMBODIMENT

Figures 1, 2:
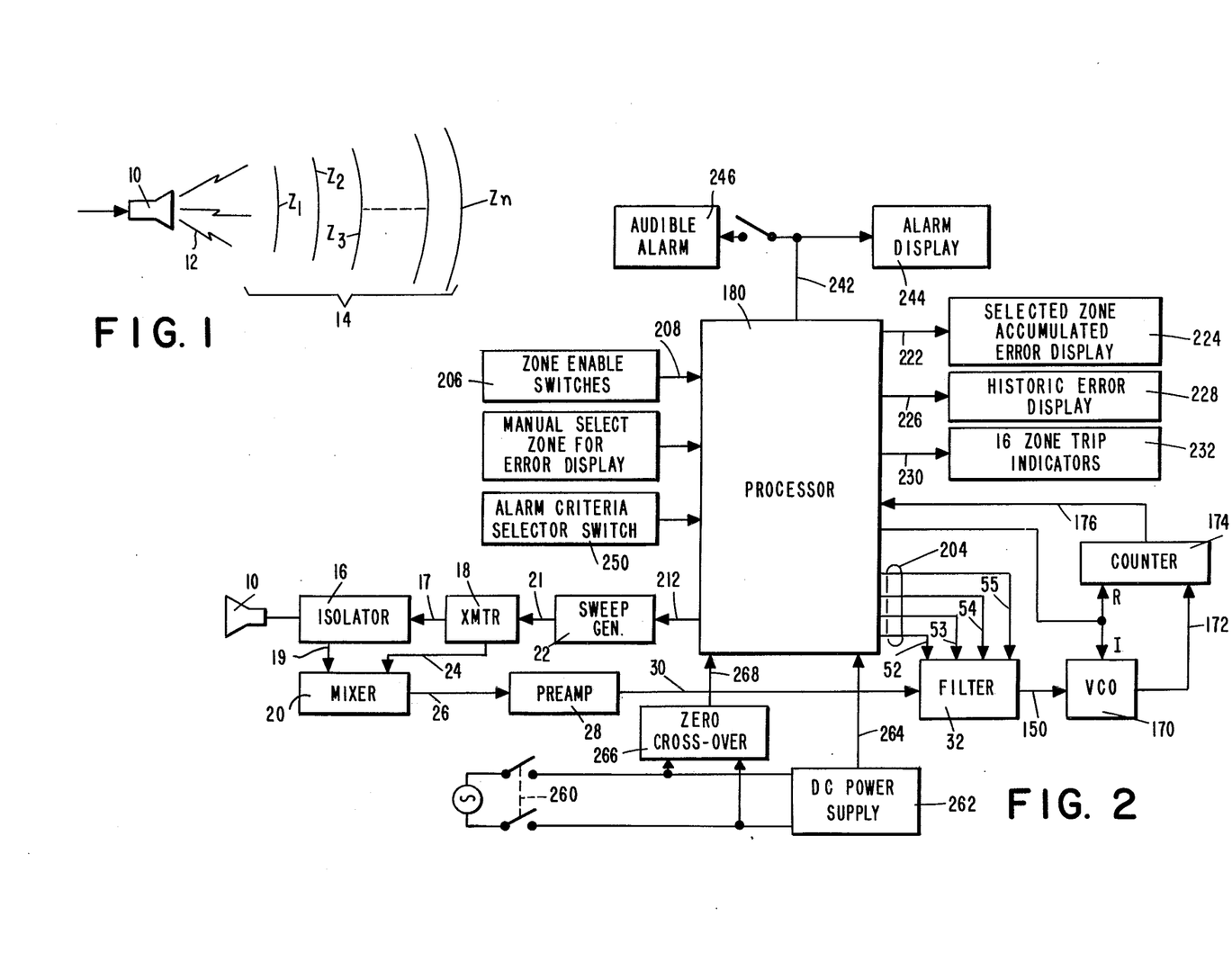
FIG. 1 is a schematic illustration of a transducer and the area which it protects when operated in accordance with the present invention.
FIG. 2 is a diagrammatic illustration of the intrusion detecting system of the present invention.

Turning now to a more detailed consideration of the drawings, there is illustrated in FIG. 1 a microwave transducer 10 which is in the form of a pyramidal horn antenna having a beam width, in the preferred form of the invention, of 15° × 15°. In this form, the antenna transmits microwave signals in a relatively narrow, pencil-like pattern to permit its use in detecting intruders in an elongated, narrow area such as along a fence or wall. Further, this long, narrow beam pattern allows the transducer to define a detected area having an elongated dimension so that, in effect, the beam pattern itself forms a virtual fence.

Although foreshortened in FIG. 1 for purposes of illustration, the narrow beam 12 transmitted by antenna 10 provides deep range coverage over an area generally indicated by 14. This range is divided into a series of overlapping zones labeled $Z_1$, $Z_2$, ... $Z_n$ which, in accordance with the present invention, may be individually and repetitively monitored by the system to detect all radar targets within that zone.

Each radar-reflective target that exists within a zone produces a reflected signal which is returned to transducer-antenna 10 and is processed in a manner to be described. These targets may take many forms, as was explained in the aforesaid U.S. Pat. No. 3,967,283, and each zone will typically produce a pattern of reflections which is a function of all of the radar targets therein. This radar pattern will normally be the same each time the zone is monitored by the system, and by storing the pattern resulting from a first scan and comparing it with the pattern obtained from a second scan of that zone, any changes in the pattern can be detected. Such changes may be caused by many factors, but of particular interest are changes which are caused by, for example, human intruders into the area being protected. When such an intrusion occurs, a relatively large difference will be measured between current and prior target patterns, and an alarm may be produced as a result thereof. Differences in the received pattern due to background noise and clutter may be ignored by a variety of circuits and techniques, including providing a threshold for the errors which will prevent response until a certain magnitude of difference is obtained.

Referring now to FIG. 2, which is a diagrammatic illustration of the system of the present invention, it will be seen that antenna 10 is connected to a suitable isolator, or transmit-receive switch, 16. The isolator alternately connects the antenna either to line 17, and thus to the output of a transmitter 18, or to line 19, and thus to the input of a receiver-mixer 20. In the preferred form of the invention, the transmitter, receiver-mixer and transmit-receive switch are a commercially-available integrated assembly such as that made by Microwave Associates, the unit employing a Gunn diode as the active element of the transmitter.

The output of the transmitter portion of the unit is about 50 mw at a nominal frequency of 10,000 mHz, with the frequency of the transmitter being modulated by a sawtooth wave produced on line 21 by a sweep generator 22, the sawtooth varying the frequency of the transmitter by between 15–80 mHz, the exact range of the modulation depending upon the particular application of the system. The frequency-modulated output of the oscillator for transmitter 18 is also applied by way of line 24 to a second input to mixer 20, whereby the transmitter serves as the local oscillator for the mixer to demodulate the received signal.

The signal received at mixer 20 at any instant corresponds in frequency to the transmitted signal a short time before, the time difference being that required for the transmitted signal to propagate to a reflective target and to return. Since the transmitter frequency is continuously changing during the course of each sweep, the signal received from any target will differ from the frequency of the signal being emitted by the transmitter at that instant, the difference being proportional to the range of that target. If the rate of change of transmitter frequency, represented by the slope of the sawtooth waveform produced by sweep generator 22, is constant for a given sweep, the difference, or beat frequency, produced at the output 26 of the mixer will correspond to the range of the target and if this target is stationary, the beat frequency will remain constant. If the total range covered by the transmitter beam 12 contains a number of targets, the mixer-receiver output on line 26 will contain a frequency component corresponding to each such target, with the specific frequency of that component being proportional to the corresponding target range. Thus, the output of mixer 20 will be a complex audio-frequency wave ensemble which will remain constant from sweep to sweep as long as there are no moving targets within the area of interest.

The complex audio tone ensemble on line 26 thus contains a plurality of signals of different frequencies and different amplitudes, depending upon the pattern of targets in the area 14 with the frequency of each component of the signal being proportional to the distance of the target which produced it, and with the amplitude of that signal being inversely proportional to the fourth power of the distance. This signal is fed through a preamplifier 28 which has a "preemphasis" slope of 12dB per octave over the range 400–4000 Hz, which has the effect of equalizing the strength of target returns over a 10 to 1 ratio of distances so that for a given size target, the strength of the return signal will be the same over a wide variation in distance.

Figure 3:
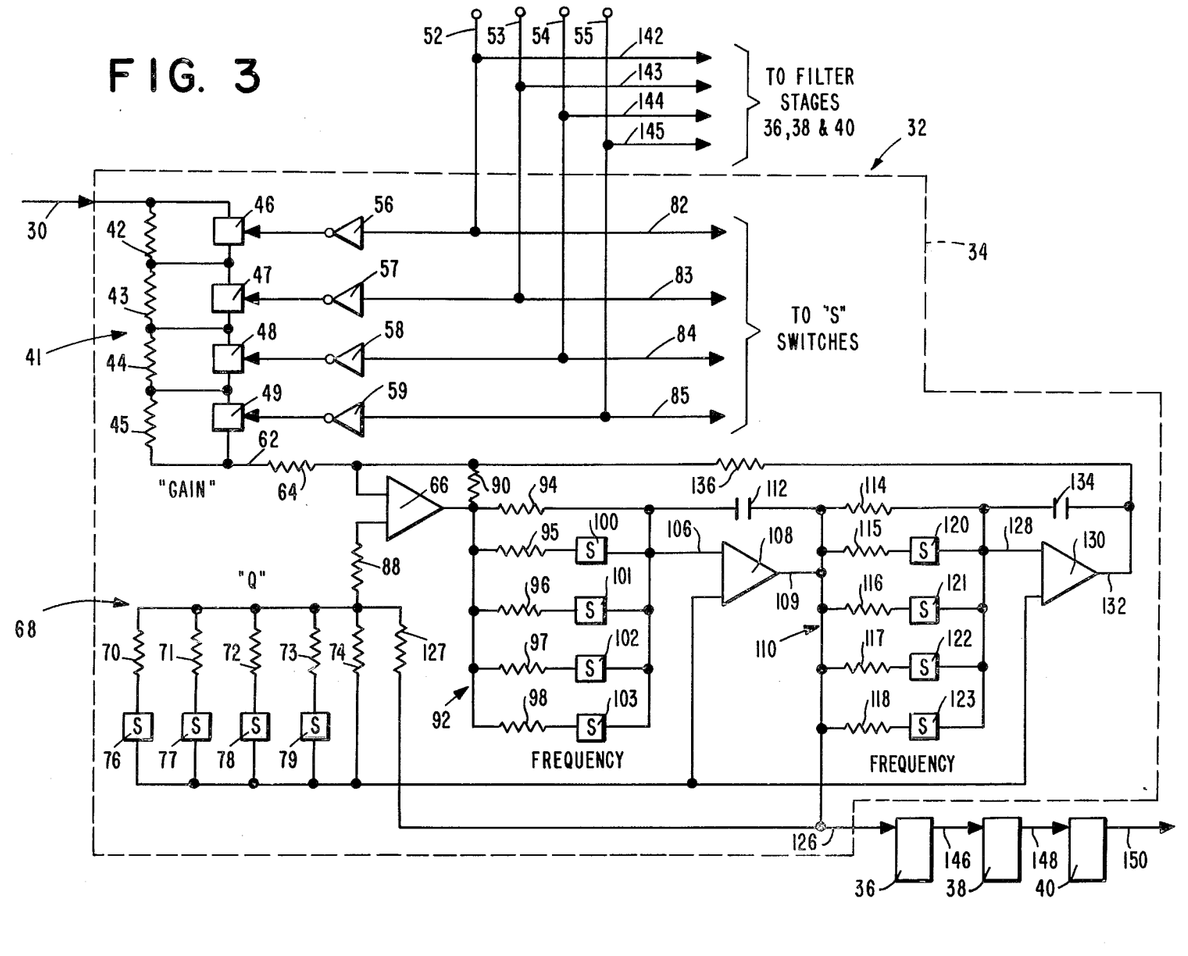
FIG. 3 is a schematic diagram of the switchable filter used for range selection in the present system.

The audio tone output from preamplifier 28 is applied by way of line 30 to a narrow band, band pass, digitally controlled, active audio frequency filter 32 which is illustrated in detail in FIG. 3, to which reference is now made. As illustrated, filter 32 includes four identical stages 34, 36, 38 and 40 connected in series and controlled by a common control. Each stage of the filter includes a gain compensation network 41 comprising resistors 42–45 which are connected in series to the input line 30, with controllable switches 46–49, respectively, being connected across each of these resistors. Each of the switches is selectively operable to bypass its corresponding resistor so that the amplitude of the signal applied to the filter by way of line 30 may be controlled.

Switches 46–49 are controlled by a 4-bit binary word supplied to the digital input terminals 52–55 of the filter.

The binary control word is applied by way of corresponding inverters 56–59 to the controllable switches 46–49 to open or close selected switches, whereby the total resistance exhibited by the gain resistors to an input signal on line 30 corresponds to and is controlled by the binary input word. Switches 46–49 may comprise any suitable switching circuit, and thus may consist of a CD 4016 C-MOS quad bilateral switch.

The output from the gain compensation network 41 appears on line 62 and is applied through a series resistor 64 to one input of an operational amplifier 66. The other input of amplifier 66 is connected to a network 68 of bandwidth control resistors comprising parallel resistors 70–74. Each of resistors 70–73 is connected in series with a corresponding controllable switch 76–79, which switches are identified for convenience by the letter "S", and which are controlled by the binary word supplied to the digital input terminals 52–55 by way of switch control lines 82–85. These switches may be suitable C-MOS switches of the same type used in the gain control network discussed above. The input digital word applied to terminals 52–55 thus controls the overall resistance of network 68, which network is connected by way of resistor 88 to the second input of operational amplifier 66 to control the reciprocal bandwidth, or Q, of the filter.

The output of operational amplifier 66 is connected to a feedback resistor 90 and to a first frequency control network 92 comprising parallel resistors 94–98. Again, resistors 95–98 are connected to corresponding "S" switches 100–103 which are controlled by the digital word input on terminals 52–55 by way of lines 82–85.

The output of network 92 is applied by way of line 106 to a second operational amplifier 108, the output of which is connected to a second frequency control network 110 and also to a feedback capacitor 112. Network 110 comprises parallel resistors 114–118, with resistors 115–118 being connected in series with corresponding "S" switches 120–123, again controlled by the binary word appearing on terminals 52–55 and applied to the switches by way of lines 82–85. The output line 109 from amplifier 108 is also connected to the first stage output line 126, which leads to stage 2 of the filter. The Q network 68 is also connected to output line 126 through resistor 127.

The output from frequency control network 110 is applied by way of line 128 to the input of a third operational amplifier 130, the output of which is in turn applied by way of line 132 to a feedback capacitor 134 connected to the input of amplifier 130, and to a feedback resistor 136 which is connected to the input of operational amplifier 66.

The output of filter stage 34 appearing on line 126 is connected to the input of the second filter stage 36, which is identical to stage 34, receiving the 4-bit binary word supplied to terminals 52–55 by way of lines 142–145. In similar manner the output of stage 36 is applied to the third stage 38 by way of line 146, which stage is also identical to stage 34. Finally, the output of stage 38 of the filter is applied by way of line 148 to the fourth stage 40, also controlled by the binary word carried on terminals 52–55, with the output of the filter thereafter appearing on filter output line 150.

In accordance with the preferred embodiment of this invention, the area 14 (FIG. 1) to be covered by the system is divided into 16 zones, and for convenience in discussing the present system this figure will be used, although it will be apparent that other zone divisions may be used, depending upon the application of the system. Each of these different zones may include one or more radar-reflective targets, and each target in each zone will produce an audio signal from the mixer 20. Preferably, the maximum frequency received will be approximately 4000 Hz, representing the greatest range of the transmitter, and will have a minimum frequency of about 400 Hz, representing the nearest target to which the system is to respond. Since targets of approximately the same distance from the transducer will produce audio signals having approximately the same frequency, the area to be covered can be divided into range zones which will have corresponding frequency zones, or bands, with each band being identifiable by a corresponding center frequency. Thus, the most distant zone may produce target return signals in a band having a center frequency of 4000 Hz, the nearest zone may produce target return signals in a band having a center frequency of 400 Hz, and the remaining zones would have center frequencies equally spaced between these limits.

Figures 4, 7:
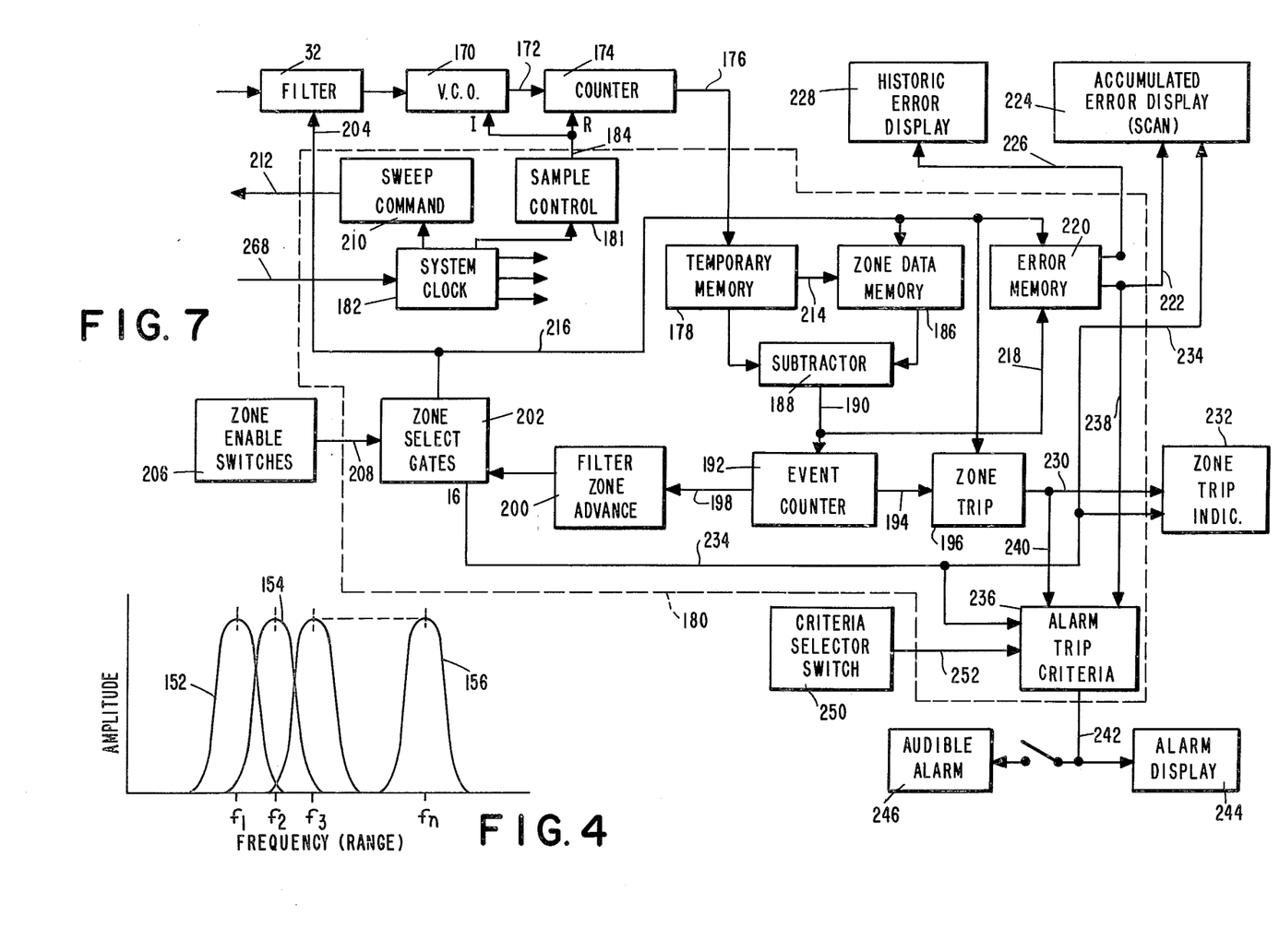
FIG. 4 is a digrammatic illustration of the band pass characteristics of the filter of FIG. 3.
FIG. 7 is a diagrammatic illustration of the information handling portion of the system of the present invention.

To switch the filter to select each of the range zones, 16 4-bit binary words are provided for application to the input of the filter 32 so that the center frequency of the bandpass of the filter can be shifted to that corresponding to the selected one of the 16 zones under surveillance by the present system. The very narrow bandpass of the filter is illustrated in FIG. 4, which shows the various center pass frequencies available for filter 32 and selectable by the binary word applied to the digital input terminals. Thus, a first digital input may select a center frequency $f_1$ for the filter, tuning the four filter stages to that frequency. When the filter is tuned to that frequency, it will have a narrow bandpass corresponding to curve 152 and will pass audio frequencies in the range defined by that bandpass curve. In the preferred embodiment, this frequency $f_1$ is 400 Hz, and represents the nearest range zone $Z_1$ (FIG. 1). The filter will only pass frequencies falling within curve 152, and thus will limit the response of the system to reflected signals from targets lying within zone $Z_1$.

If another binary word is applied to inputs 52–55, the filter switches will be activated to next select a center frequency $f_2$, the filter will shift and will pass only frequencies falling within the curve 154, thereby limiting the response of the system to audio signals corresponding to reflections from targets within zone $Z_2$. Similarly, selection of a center frequency $n$ will result in a shifting of the filter to pass only frequencies falling within the curve 156, which frequencies correspond to return signals from zone $Z_n$. In the preferred embodiment of the invention, this may be zone 16, the most distant zone from the antenna 10, with a center frequency of about 4000 Hz.

As illustrated in FIG. 4, the bandpass response curves of the filter are preferably selected to be overlapping so that an intruder entering the area being protected will disturb the pattern in several adjacent zones at one time, thereby permitting accurate location of the intrusion. Further, by dividing the area to be protected into 16 separate zones, the total background noise within the area 14 is, in effect, divided by 16 insofar as any particular target is concerned. At the same time, this reduction of background noise does not reduce target reflection intensity, with the result that vastly improved target detection is obtained.

An advantage of the narrow bandpass switchable filter is that a sharp cutoff is provided at the beginning and at the end of the target range so that spurious signals outside the area to be protected do not affect the system. This advantage is not available with a broad bandpass filter which might be used to cover the same range, but which would have a much more gradual slope at the beginning and at the end of the desired range, and which therefore would not be capable of providing a sharp cutoff at the most distant range zone. By use of the switching arrangement of the present invention, the filter may be shifted from one narrow range to the next at a high rate of speed so that the filter provides the wide coverage required and gives the appearance of being a wide pass filter, thus providing the advantages of both types of filters.

In order to maintain the Q, or reciprocal bandwidth, of the active filter 32 at a value such that the bandwidth will remain relatively constant throughout the full range of frequencies through which the filter is switched, the bandwidth adjusting resistor network 68 must be carefully selected. The Q of the filter has its maximum, or reference, value at the top frequency, and varies in proportion to frequency at the other settings. In a preferred form of the invention, the reference Q was initially established at a value of 8. This resulted in a range response such as that illustrated in FIG. 4, where adjacent zones overlap at about the −3dB level below the peak amplitude of the center frequency. This overlap between zones can be reduced by increasing the steepness of the cutoff by raising the value of the reference Q above the nominal value of 8 selected. However, transient response considerations set a practical upper limit to the value of Q to 10 or 12, as illustrated in FIG. 5, to which reference is now made.

Figure 5:
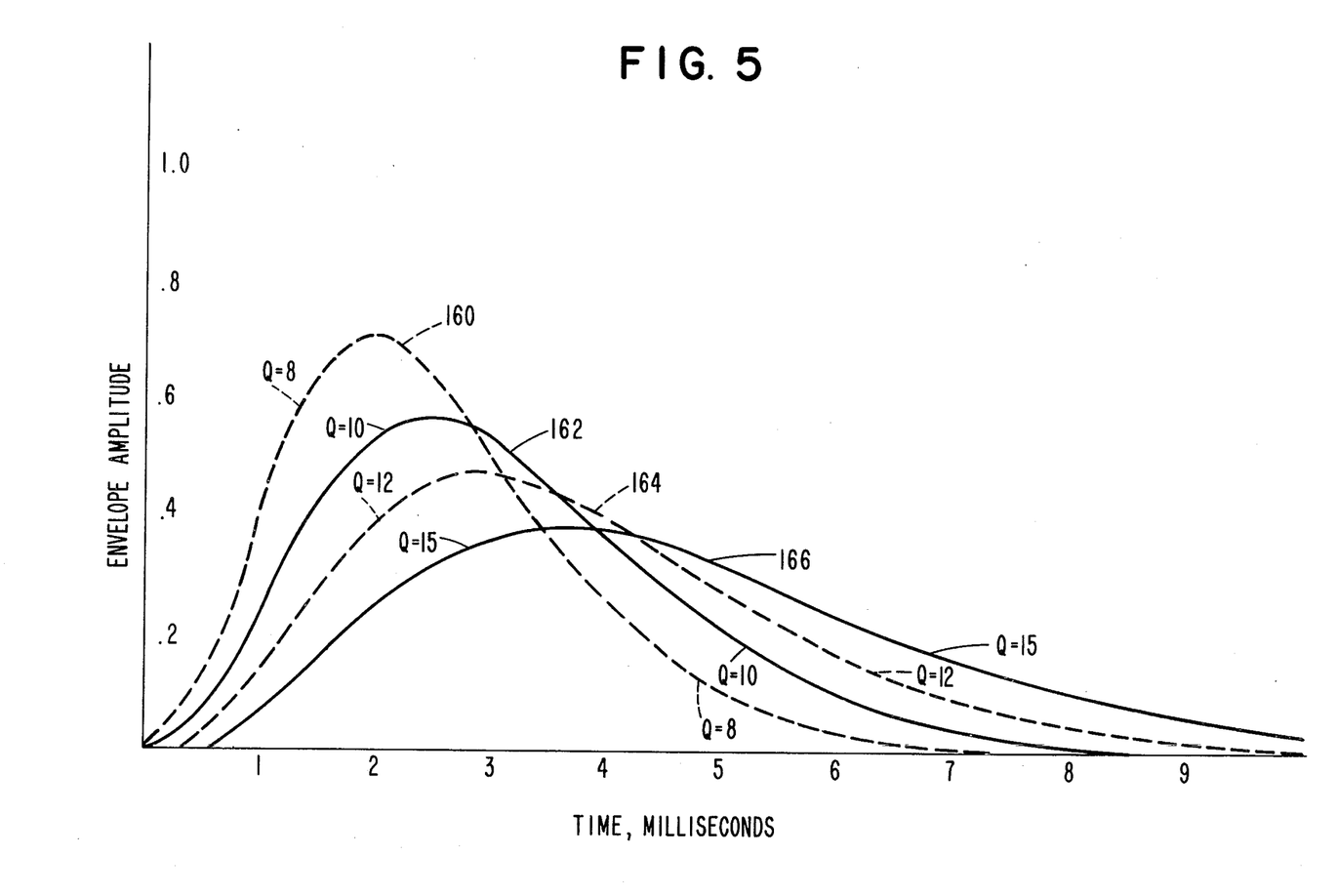
FIG. 5 is a diagram of the theoretical transient response of the band pass filter of FIG. 3.

The curves of FIG. 5 show the theoretical transient response of the four stage active filter 32 when it is operated at an upper frequency level of 4000 Hz. As shown by curve 160, when the value of Q is equal to 8, transient impulses cause ringing of the filter. Such transients may be caused by filter switching or by the start of a frequency sweep of the transmitter, and in the present system appear about 10 milliseconds before the start of each frequency sweep. This ringing can interfere with the detection of targets by the system if it has not decayed to a sufficiently low value by the time return signals are received from the area being protected. For good cycle-to-cycle repeatability of the system, any filter ringing caused by these transients should decay to about −40dB in 10 microseconds or less, and it may be seen from curve 160 that this condition is fulfilled when Q is equal to 8. If the Q is increased to 10 or 12, as illustrated by curves 162 and 164, the ringing caused by transients remains for a longer period of time, with the curve 164 extending to the limit of 10 milliseconds. As noted with curve 166, however, this condition is not met by a Q value of 15 or more, and accordingly this factor places a limit on the bandwidth of the filter.

The physical range or distance of coverage represented by area 14 in FIG. 1 depends upon the frequency deviation of the transmitter 18 which is produced by the modulating effect of the sawtooth wave generated by sweep generator 22. Thus, if the frequency deviation of the transmitter is 40 mHz, the center of the outermost range zone $Z_n$ occurs at about 300 ft. from antenna 10, with each of the closer zone peaks occurring at 18 ft. intervals, producing a spacing between the centers of the innermost and outermost ranges of about 270 ft. If the frequency deviation of the transmitter is increased to 80 mHz without altering the characteristics of the filter, the maximum range and zone width are telescoped to 150 ft. and 9 ft., respectively. If the deviation is 80 mHz, but the resonant center frequencies of the filter are all doubled, as by changing the values of the resistors in the frequency control networks 92 and 110 to different values, the original 30-300 ft. coverage can be restored. This higher frequency deviation then would allow the Q of the filter to be doubled to reduce zone overlap and increase the steepness of range cutoff at the outermost zone, as by increasing the steepness of curve 156 in FIG. 4, without introducing transient response problems. Thus, the selection of frequency deviation of the transmitter will be based on the particular application of the system, and may require some modification of the absolute values of the components in the filter to produce the desired response.

Figure 6:
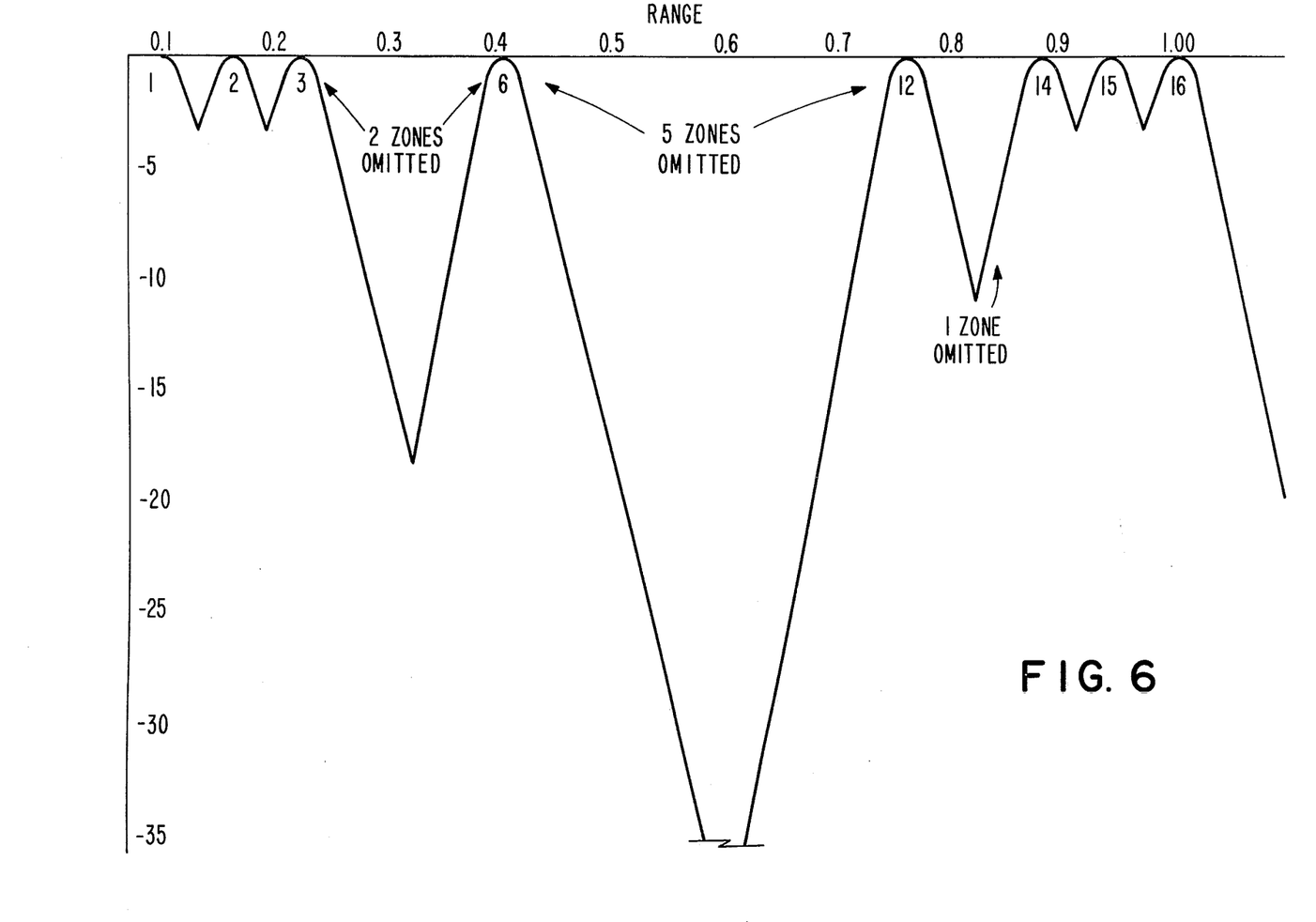
FIG. 6 is a diagrammatic illustration of a selected pattern of response for the system of the present invention.

It will be appreciated that in the selection of the digital input to the filter, it is not necessary to shift the filter from one center frequency to the next adjacent center frequency, although such an operation would be desired if a continuous scan of the area to be protected is required. Accordingly, under some circumstances it may be desirable to cover the area in a reverse sequence, to select the various center frequencies at random, or to omit certain frequencies. The latter arrangement may often be used where it is desired to eliminate the effect of specific background noises which have their origin at a specific range. Thus, as illustrated in FIG. 6, the pattern of response for the filter may be designed to meet the particular requirements of the specific application of the system. In FIG. 6, for example, the regular pattern of response illustrated in FIG. 4 has been varied by omitting zones 4, 5, 7, 8, 9, 10, 11, and 13. This is accomplished by providing in sequence at the digital input terminals 52–55 binary words which represent in sequence zones 1, 2, 3, 6, 12, 14, 15, and 16. As a result, for each sweep of the transmitter, the filter is switched to the next one of the selected center frequencies, so that after 8 sweeps of the transmitter, the full range of the area to be protected has been covered from zones 1–16, except that certain zones have been omitted. This produces the response pattern for the filter illustrated in FIG. 6.

Since Q is a function of frequency, the overall Q of filter 32 would be expected to change in value as the filter is switched from one center frequency to the next. However, the Q resistor network 68 compensates for this variation, and maintains the Q at a selected value throughout the range of operation, the switches 76–79 responding to the digital input binary word to provide this compensation at the same time that the center frequency is changed by the same input word. Similarly, the change in Q and in frequency produces a variation in gain of the filter as it switches from one frequency to the next, and the gain resistors 41 are accordingly switched into or out of the filter as required to maintain the gain at a constant level. It will be noted that the overall gain of the system may be preset, for example in the preamplifier, and will normally be adjusted to the level required for reliable detection of targets of interest. Thus, for example, the target may be selected as being a man crawling through the zone being protected and since such a target produces a relatively small radar cross section, the gain would have to be set up to a relatively high level to insure detection. If this is done, however, a man walking through the protection zone will produce a return signal of a much greater magnitude, and in the preferred embodiment of the system would produce a signal of at least 20dB over the threshold detecting value. This will result in the return signal being very strong and appearing in several zones at once, particularly where the bandpass of the filters produce considerable overlap. Thus, a balance must be maintained between the bandwidth of the filter and the type of target which is to be detected, to insure maximum reliability of the system.

It should be noted that the overlapping zone arrangement of the filter is not necessarily undesirable, for the fact that a large target produces signals in a plurality of zones at once can be used as an alarm criterion in and of itself. Thus, the system can be used to distinguish between targets of various sizes by, in effect, detecting amplitude variations in the return signals of several zones, producing an alarm when signals above a given amplitude appear in, for example, three successive zones. This amplitude discrimination permits the system to eliminate from consideration return signals of low amplitude caused by background noise, small animals, and the like, for with the range compensation of the preamplifier, the amplitude of the signal is essentially a function of target cross section, not distance.

In summary, the output signals on line 150, therefore, are limited to the range of frequencies to which the filter is tuned at any given instant, and thus will represent reflections from targets within the selected target zone. Further, the signal will be a complex wave containing components corresponding to each of the targets within the zone, with the amplitude of the wave at any given point being a function of the cross sectional dimension of that particular target so that large targets produce large amplitude signals and small targets produce low amplitude signals.

The waveform appearing on line 150 is applied to the input of a voltage-to-frequency converter 170 which is an oscillator having an instantaneous frequency which is a linear function of the applied signal voltage. Thus, oscillator 170 produces on its output line 172 a signal having a continuously varying frequency proportional to the amplitude changes of the complex wave applied to it on line 150. By sampling and obtaining a measure of the frequency of the signal on line 172, the amplitude of the input voltage at the moment of sampling can be determined. For this purpose, a counter 174 is provided which receives the variable frequency signal from line 172 and obtains a count of the number of oscillator cycles during a selected short time interval, which count is proportional to the average applied voltage during that interval.

Counter 174 is an 8-bit counter which may be cycled to obtain eight samples of the signal wave on line 172 for each sweep of the transmitter. In the preferred form of the invention, the sawtooth waveform produced by sweep generator 22 has a duration of 7.5 milliseconds and the counter is operated so as to obtain 8 samples of the signal wave in the last 1.5 milliseconds of that sweep. This arrangement allows the ringing effect caused by the switching of the filter, described with respect to FIG. 5, to substantially die away before the count is taken so that such transients do not affect the operation of the system. Again referring to FIG. 5, it will be seen that if the sweep length is 7.5 milliseconds, reasonable transient response will be obtained if the filter utilizes a Q of 8, for the ringing effects will have substantially died down after 6 milliseconds and will leave the remaining portion of the sweep relatively free of transients.

The eight sample counts of the waveform on line 172 obtained during a single sweep of the transmitter represent the target content of the particular zone to which the filter 32 is tuned. By switching the center frequency of the filter between each sweep of generator 22, the entire area 14 to be protected will be covered, one zone at a time. If all 16 zones are selected, at the end of the 16 sweeps, the counter will have obtained eight 8-bit binary words for each range zone, or 128 words, which describe in binary form the target content of the entire area to be protected.

The 8-bit binary words produced by the counter 174 are supplied by way of input line 176 to a processor 180 such as a conventional, commercially available microprocessor. In a preferred embodiment of the invention, this processor was a Signetics 2650 microprocessor manufactured by the Signetics Corporation. This microprocessor includes conventional items such as programmable read-only memory for program storage, a random access memory (read-write, or RAM) for storage of variable data, output port latches, and input port gates. The processor also contains the system clock, address and data buffers, control signal decoder circuitry, and the like, all of which are conventional and which operate in their known manner to provide the necessary control signals for operating the sweep generator, controlling the switching of the center frequency of filter 32, and activating the counter 174 to obtain the required samples of the complex waveform representing the targets within the zones of protection.

Since most of the elements of the microprocessor operate in their known and conventional manner to provide such controls, details of the system clock, the various address and data bus buffers, and the like have not been illustrated. However, in FIG. 7, to which reference is now made, a portion of the logic circuitry within the microprocessor is diagrammatically illustrated to indicate the manner in which the system of the present invention operates to determine when the return signals on line 172 meet specified alarm criteria, and further to indicate the manner in which alarm signals are produced.

Turning now to a consideration of FIG. 7, it will be seen that the output from counter 174 is applied by way of line 176 to be stored in a temporary memory 178. The counter 174 and the voltage controlled oscillator 170 are operated by a sample control circuit 181 which is driven by the main microprocessor counter 182, which may be the system clock, to turn the voltage controlled oscillator and the counter on whenever it is desired to obtain samples of the filter output signal. Thus, the sample control periodically activates the counter 174 to obtain the 8-bit words which describe the content of the target zone, which words are stored in the temporary memory 178 in to corresponding zone locations. As previously indicated, no samples are taken for at least the first 75 percent of the frequency sweep of the transmitter so that transients generated in the filter will die down. During the last portion of the sweep, when sampling is to occur, the voltage controlled oscillator 170 and the counter 174 are on for over 90 percent of the sample-to-sample period in order to obtain relatively large sample counts and thus to achieve maximum sensitivity to small changes in the input waveform. The sample control circuit resets the counter and turns off the oscillator periodically during the sampling time by way of the reset and inhibit line 184, leaving the oscillator and the counter operating during most of the sampling period and transferring each count, or binary word, to the temporary memory for storage in the section of the memory corresponding to the range zone being scanned.

After 8 samples have been taken of a selected zone, for example, zone 1, each sample word is compared on a word-by-word basis with the samples obtained for that same zone in the previous sweep of the zone. This prior sweep information is stored in the zone data memory 186, with the data in memories 178 and 186 being compared in a subtractor 188, in the manner described in U.S. Pat. No. 3,967,283. If there has been no change in the target pattern within the zone under consideration, there will be no differences between these words, and no output will be obtained from subtractor 188. However, if a target moves within the protected area, the absolute value of the difference between the data in memories 178 and 186 will produce error counts, which are fed by way of line 190 to an event counter 192. If the number of errors exceeds a threshold number such as 4, as determined by counter 192, the event counter will produce an output on line 194 to activate a zone trip network 196.

In order to prevent false alarms due to transient conditions, the occurrence of an "event", as indicated by an output from counter 192, causes the system to repeat the sweep of the same zone. This new sweep will again produce eight binary words in the temporary memory 178 which will again be compared with the aged data in the zone data memory 186. The output of subtractor 188 is again applied to the event counter and, if required, the sweep of that same zone will again be repeated. When the event threshold is exceeded a preselected number of times out of consecutive sweeps of the same zone, the zone trip network 196 will be activated to indicate an alarm condition for that particular zone. In a preferred form of the invention, the system was established to produce a zone trip indication when the threshold of 4 errors was exceeded twice out of three consecutive sweeps of a given zone so that two events occurring in three sweeps of a zone cause a trip condition. The effect of a zone trip condition will depend upon the alarm criterion selected.

If no event is detected in the first sweep of a selected zone, or if less than the prescribed number of events occur in a plurality of sweeps, the event counter 192 produces an output on line 198 which is applied to a filter zone advance circuit 200 which shifts the center frequency of the filter to the next selected zone by way of zone select gates 202. These gates 202 produce the binary words which are applied to the digital input of the filter by way of cable 204 and to the filter input terminals 52, 53, 54 and 55. As was discussed with respect to FIG. 6, certain of the select gates 202 may be disabled by means of manually operable zone enable switches 206 connected to the gates 202 by way of cable 208. These enable switches permit the operator of the system to establish a predetermined pattern of protection over the area 14, in the manner illustrated with respect to FIG. 6, so that certain of the center frequencies are omitted when the filter is advanced by network 200.

When the filter has been shifted to the next zone, for example zone 2, the process is repeated, with the transmitter being swept by the sawtooth from sweep generator 22. This sawtooth waveform may be periodically initiated in any suitable manner, as by a sweep command circuit 210 responsive, for example, to the main system clock 182. The sweep command signal may be applied by way of line 212 to the input of the sweep generator 22. As the sweep of zone 2 progresses, counter 174 provides eight binary words which are stored in the temporary memory 178, and upon completion of the sweep these words are compared with the aged zone data in memory 186 corresponding to zone 2, and the error signals are applied to the event counter 192. Again, if the predetermined threshold is reached, the filter zone advance circuit 200 will not be activated, and the next sweep will be of the same zone to obtain a second count for storage in memory 178 and subsequent comparison with the content of memory 186. Upon completion of the sampling and comparison of zone 2, the filter zone advance network 200 shifts the filter to its next center frequency and the process is again repeated.

It will be noted that the center frequency of the filter is shifted as soon as the trip/no-trip decision is made by the event counter and the zone trip network 196 in order to allow maximum time for any transients induced by filter switching to die out before the next samples are taken. When the filter frequency is advanced, the latest data from the immediately preceding sweep just completed is transferred into the aged data memory 186 by way of connector line 214 so that memory 186 is then updated to contain the most recent data corresponding to that zone. After such transfer, the zone select gate output on cable 204 is applied by way of cable 216 to shift memory 186 to the next selected zone so that the information presented to subtractor 188 from memory 186 will correspond to the zone being swept.

The output error signals on conductor 190 are also applied by way of conductor 218 to an error memory 220 which contains a memory location for each of the range zones, as well as suitable adders which permit an addition of the errors from each sweep to the errors recorded in the previous three sweeps. Thus, the error signals produced in each sweep of each zone are supplied to error memory 220 which accumulates an error history of the preceding 4 scans of the 16 range zones, a scan being a complete traverse of the zones. The error memory is connected by way of lines 222 to an accumulated error display 224 which may be a suitable lamp array capable of indicating the accumulated error in each of the 16 zones, the total error being equal to the errors obtained in the preceding 4 sweeps of each zone.

The error memory 220 also includes locations for accumulating the sum of the errors occurring in all of the range zones for the preceding 4 sweeps. This sum is a single number which may be applied by way of conductor 226 to a historic error display unit 228. Note that the error memory 220 is synchronized with the zone selecting circuitry by way of conductor 216 to insure that the applied error signals are stored in corresponding range locations. It will be recognized that the memories 178, 186 and 220 illustrated in FIG. 7 may all be a part of, or locations in, a single large memory unit.

The zone trip network 196, which receives outputs from event counter 192, will be activated when the selected event criterion have been met; that is, for example, when two out of three sweeps in a zone produce event indications. When the zone trip network is thus activated, it produces an output on line 230 which may be applied to the zone trip indicators 232 to provide a visual display of the location of an intruder.

After a scan of the 16 zones is completed, which requires about 0.25 second in the preferred form of the invention, the accumulated error display 224 and the zone trip indicators 232 are activated, for example, by an output on line 234 from the zone select gates 202 corresponding to zone 16 to permit the data in the error memory 220 and the zone trip network 196 to update the data in display 224 and indicator 232, respectively. The signal on line 234 also activates the alarm trip criteria circuit 236 which receives the error information from memory 220 and the trip information from the zone trip network 196 by way of lines 238 and 240. Criteria circuit 236 determines what input data will constitute an alarm condition, and in response to the appropriate data will produce a signal on its output line 242 to activate an alarm display 244, an audible alarm 246, or both. The specific criteria which will produce an alarm output may be selected by a criteria selector switch 250 connected to the criteria network 236 by way of line 252.

Typically, the alarm trip criteria network 236 is preset to produce an alarm signal under one or more of a variety of conditions, and the selector switch 250 permits the operator of the system to establish which of the conditions will actually produce the alarm in a given application of the system. The criteria network essentially consists of suitable counters, memory units, gates and like networks which will keep track of the magnitude of the error and zone trip signals as well as the history of such signals to determine when an alarm should be indicated. Thus, for example, an alarm criterion may be established to produce an alarm signal if a zone trip has occurred in any enabled zone, and when this particular criteria has been selected by switch 250, an alarm will be sounded at the completion of a complete scan of the 16 zones whenever there is a zone trip.

As a further example, a second criterion may be selected which would prevent response to electrical transients of considerable duration, such as those that might be caused by lightning strokes, to prevent false alarms. As has previously been noted, very short transients, such as those less than 1/60 second in duration, will be eliminated by the two-out-of-three event requirement for a trip, and accordingly the very short transients are always eliminated from consideration in the preferred form of the invention. However, if a transient lasts long enough to produce a zone trip even when there is no actual intruder, not only will this cause a false alarm but it will also cause the transient to be stored in the aged memory 186 so that when the next following normal sweep occurs, the subtractor will produce a second event and another zone trip. To avoid this effect of long term transients, an alarm criterion may be set up to require the existence of a trip condition in both the most recent prior scan and the third from the most recent prior scan of any enabled channel before an alarm is generated so that if a transient condition should be stored in memory 186, it will be ignored. This arrangement has been found to reject transients of ½ second or shorter duration.

A third alarm criterion may be established to detect the order in which range zones are traversed by a target to provide an indication of whether the target is advancing, receding, or moving at a constant range with respect to the radar transducer. As a part of this criterion, radial velocity may be taken into account in order to limit response to velocities which exceed or which fall within selected limits. Another criterion may require repetition of target motion over a period of time, or may eliminate error signals which represent repetitive motion. Another criterion which may be selected as indicating an alarm condition is that of radar cross section of a target, the cross section being evidenced by the number of zones in which the target appears simultaneously. Thus, for example, if a target appears only in one zone, it may be ignored as being too small to be of concern, whereas if the target appears in three or more zones, it would indicate an alarm condition.

The alarm trip criteria circuit 236 thus responds to zone trip information from network 196, error information from memory 220 and event counter 192, as well as other acquired data and establishes the required combination of conditions which would produce an output on line 242. The selector switch 250 provides means for determining to which criterion the system will respond. The specific criterion selected for a particular application of the system will depend upon the geometry of the site at which the system is located, and the anticipated threat of intrusion. For example, the absence of radial progress from one zone to the next of a detected target might be the basis for either rejection or recognition of that target return as being an intruder, depending on the path which an intruder must traverse to accomplish his mission. If the geometry of the site being protected would require an intruder to pass through several zones in sequence, then the occurrence of a target which does not follow that pattern would be rejected, even though it met other requirements as to radar cross section, and the like.

The purpose of the various criteria set up in the system is to minimize the incidence of nuisance alarms, without sacrificing the probability of detecting legitimate targets. This is done by discriminating against the random motions of, for example, a grazing animal, the random direction, high velocity, straight path of a bird, or the constant value signal produced in all of the zones at the same time by rain, as compared to the inferred behavior of an intruder. These and other criteria can be established in the alarm criteria circuit 236 in known manner, and the particular circuit for doing so is known in the art, and does not constitute a part of the present invention. Such criteria may be hard wired into the system in the form of specific logic networks, or may be provided in the form of an alarm criteria program established in a suitable memory.

Figure 8A:
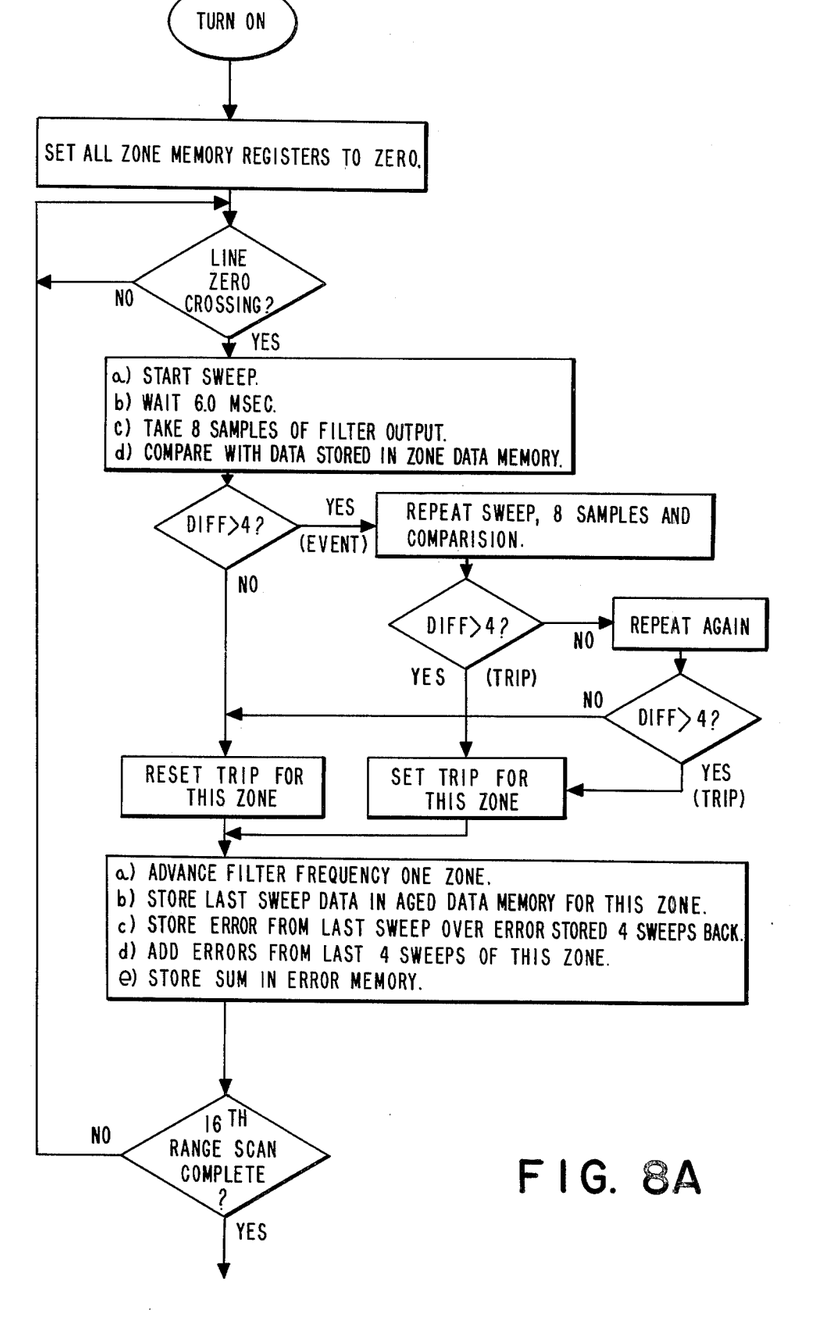
FIGS. 8a and 8b illustrate in tabular form the function of the present system in detecting and identifying an intruder.
Figure 8B:
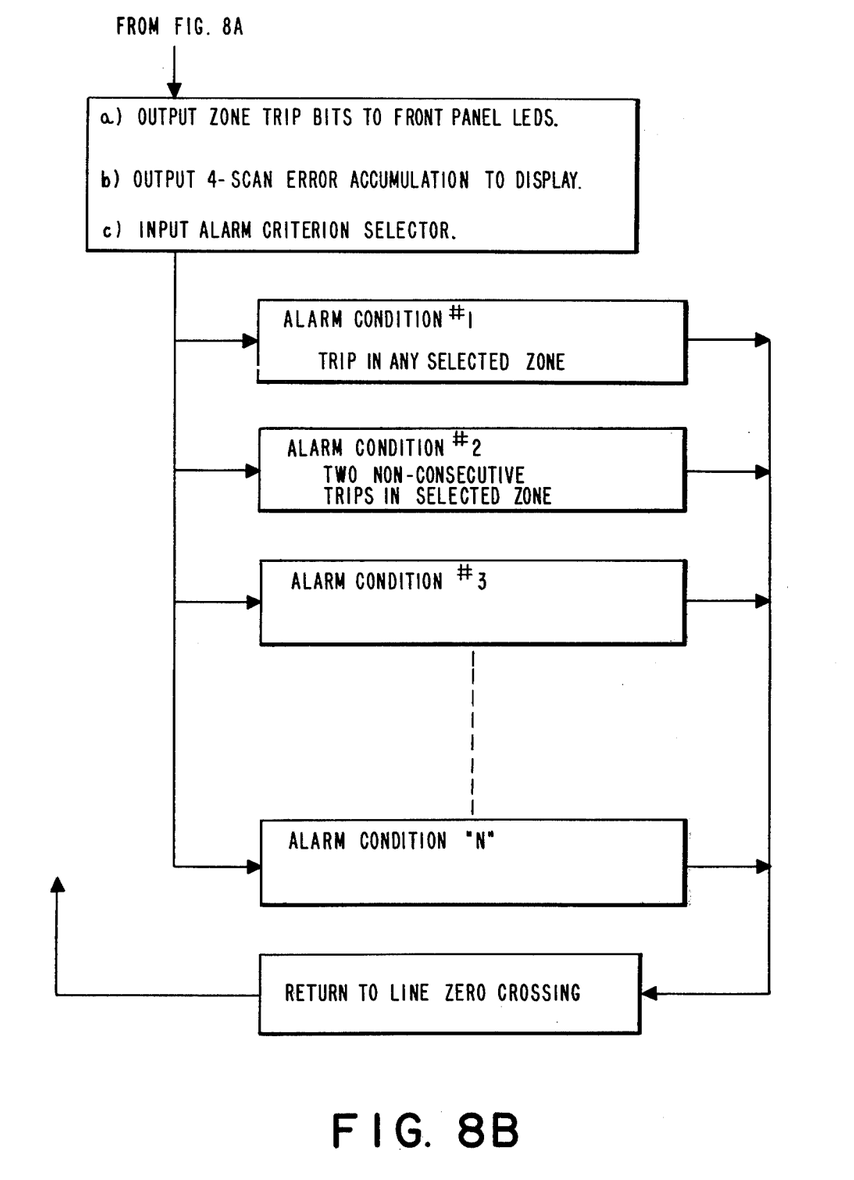

The overall operation of the system as described above is summarized in the operational flow chart which is illustrated in FIGS. 8a and 8b. As illustrated in those figures, when the system is initially turned on by closing master power switch 260, the DC power supply 262 is activated and supplies power to the processor 180 and the peripheral equipment by way of line 264. This initial application of power resets the memories 178, 186 and 220 to zero and places the processor in condition for the first scan of the area to be protected. A zero cross over detector 266 is connected across the AC power source for the system to synchronize the operation of the intrusion detector with the main power supply so that interference from fluorescent lights and other electrically operated devices will be minimized. Thus, the zero cross over network provides an output on line 268 which synchronizes the main system clock 182 with the AC power supply.

Upon occurrence of a zero line crossing the sweep generator 22 is activated by a sweep command signal on line 212. Six milliseconds later, the sample control network 181 activates the voltage controlled oscillator 170 and the counter 174 to obtain eight samples of the output from filter 32, which samples are then compared with data previously recorded in the zone data memory 186, as during a previous scan of the area. If that comparison produces error signals exceeding the predetermined threshold, then an event is indicated, and the scan of that zone is repeated a sufficient number of times to determine whether the error is transient or is actually an indication of an intruder. If, for example, two-out-of-three scans of that zone indicate the existence of an event, the zone trip network 196 is activated; on the other hand, if subsequent scans indicate that the signal represented a transient, the zone trip network is reset to zero for that zone.

After a determination has been made for the first zone, the filter is advanced to the next frequency zone and at the same time the last sweep data obtained from the prior zone is stored in the corresponding zone data memory for use in subsequent scans of the area. In addition, the error from the last sweep is transferred to the error memory 220 and replaces the error stored 4 sweeps previously. The remaining four error signals are then added in the error memory for that zone, and stored for subsequent display of the accumulated error.

The foregoing procedure is repeated until all 16 zones have been swept, thereby completing a single scan of the area being protected. At the end of this scan, the zone trip indicators 232, which may be suitable LED devices, are updated to provide a display of the status of each of the zones. In addition, the error displays 224 and 228 are updated and the accumulated errors indicated on suitable displays. If desired, display 244 may be manually controlled by a suitable selector (not shown) which would permit display of the accumulated error in a single selected zone; alternatively, a display may be provided for each zone so that all may be activated at the same time.

With the updating of the displays, the error and trip data are applied to the alarm trip criteria circuits 236 and the criteria selector switch then is operative to determine which criterion should be used for determining whether an alarm condition exists. The selected alarm criterion is then followed, producing an alarm signal if met, and the system then returns to the start of the next scan.

In a test of the preferred form of this invention, the system was set up in a clear outdoor area and the system was operated with a deviation of 50 mHz, with a Q of 8, and with a threshold difference (error) count of 4. In this system, the maximum range was about 300 ft. and it was found that good sensitivity was obtained. The system was capable of consistently detecting slight head motion of a person lying on the ground at the 150 ft. range, and could detect a walking person at 300 ft. A walking man typically appeared in two or three range zones simultaneously at ranges up to about 100 ft., and in three or four zones at ranges greater than 100 ft. An automobile driven across the beam appeared in 6 zones simultaneously. The operation was stable and free of false alarms.

Although the present invention has been disclosed in terms of a preferred embodiment, it will be understood that numerous variations and modifications may be made without departing from the true spirit and scope thereof. Thus, for example, an additional switch can be added to the Q-determining network, 70–79 of FIG. 3, for the purpose of reducing the effective Q of the filter to a very low value at any desired time. This capability can be used to eliminate ringing of the filter which may be caused by recurring strong transients such as may occur at the start of a sweep, upon switching of the filter, or if the transmitter is turned on and off during the scan cycle to conserve power or for some other reason. Further, the application of the principles of this invention is not limited to the specific type of active filter shown in FIG. 3, which is known as the "short variable" type filter. The principles of digital control of frequency, gain, and Q of an active filter by means of resistors and analogue switches can also be applied to the type of filter known as the "Bi-Quad", or to any type of filter in which these parameters can be varied over appropriate ranges by the selection of circuit elements.

What is claimed is:
1. A motion sensor for detecting intruder motion within each of a plurality of range zones within a protected area, comprising:
   transmitter means for transmitting frequency modulated continuous wave signals in a pattern to cover said protected area, said transmitted signals having a selected, repetitive frequency deviation;
   receiver means for recovering signals reflected by target scatterers in the path of said transmitted signals, said receiver means including means for demodulating said received signals to produce an ensemble of audio tones, each tone representing the range of a target scatterer within said protected area;
   a controllable, narrow bandpass range filter switchable between a plurality of frequency bands having predetermined center frequencies, each frequency band corresponding to a selected range zone within said protected area,
   means supplying said ensemble of audio tones to said range filter, said filter passing only those tones falling within the selected frequency band so that tones at the output of said filter correspond to targets within the selected range zone;
   zone control means for selecting the frequency band and thus the range zone of said range filter;
   means for storing values representing the audio tones passed by said range filter for each selected range zone during a first scan of said protected area;
   comparator means for comparing said stored values for each selected range zone with values representing the audio tones passed by said range filter for said selected range zones during a second scan of said protected area and for producing error signals corresponding to differences between said compared values, said error signals representing changes in the target patterns within said range zones;
   event detecting means responsive to said error signals to produce a zone trip when the change in target pattern within a zone exceeds a preselected threshold level; and
   alarm means responsive to predetermined zone trip and error signal levels to produce an alarm condition indicative of an intruder within said area.
2. The motion sensor of claim 1, further including sweep generator means driving said transmitter to produce said frequency modulation, whereby said protected area is swept repetitively by said transmitted signals.

3. The motion sensor of claim 2, wherein said zone control means for said range filter comprises zone selector means for shifting the frequency band of said range filter before each successive sweep of said protected area by said transmitted signals, whereby the output from said range filter is a succession of audio frequency waveforms representing the target patterns within the selected zones.

4. The motion sensor of claim 3, wherein said control means for said range filter comprises means responsive to said event detecting means to inhibit said zone selector means upon detection of an event, whereby said frequency band of said filter remains constant during a predetermined number of additional sweeps of the range zone which produced the detected event, and wherein said comparator means is operative to produce error signals for each said additional sweep of the range zone.

5. The motion sensor of claim 3, wherein said range filter is an active, multistage filter, each stage comprising:
a frequency control network for selecting the center frequency of said filter;
first switch means for switching said frequency control network to a selected band;
a Q compensation network for compensating for the change in the Q of said filter in switching from one frequency band to another;
second switch means for adjusting said Q compensation network;
a gain control network for compensating for changes in the gain of said filter in switching from one frequency band to another; and
third switch means for adjusting said gain control network, said first, second and third switch means being responsive to said zone control means to select the frequency band of the filter, and to adjust the Q and the gain of the filter.

6. The motion sensor of claim 5, wherein each stage of said filter further comprises operational amplifier means connected in series with said frequency control and gain control networks between the input and the output of the filter, and wherein said Q compensation network is connected in parallel with said frequency control network.

7. The motion sensor of claim 6, wherein said gain control network comprises a plurality of resistors connected in series, and wherein said third switch means comprises selectably operable switches for bypassing corresponding resistors.

8. The motion sensor of claim 6, wherein said Q compensation network comprises a plurality of parallel connected resistors, and wherein said second switch means comprises selectably operable switches for connecting selected resistors into said network.

9. The motion sensor of claim 6, wherein said filter further includes a second frequency control network connected to said first frequency control network and including fourth switch means for switching the second frequency control network to said selected band.

10. The motion sensor of claim 9, wherein said first and second frequency control networks each comprise a plurality of parallel connected resistors and wherein said first and fourth switch means each comprise selectively operable switches for connecting selected resistors into their corresponding frequency control networks.

11. The motion sensor of claim 9, wherein said zone control means comprises means for simultaneously operating said first, second, third and fourth switch means 12. The motion sensor of claim 11, wherein said zone control means comprises digital control means.

13. The motion sensor of claim 1, wherein said alarm means comprises means responsive to a zone trip condition in any zone to produce an alarm indication.

14. The motion sensor of claim 1, wherein said alarm means comprises means responsive to a zone trip condition in at least two adjacent zones to produce an alarm indication.

15. The motion sensor of claim 1, wherein said zone control means includes means for selecting only predetermined range zones, a scan of the protected area comprising at least one sweep of each selected zone.

16. The motion sensor of claim 1, wherein said alarm means includes selector means for selecting the zone trip and error signal levels required to produce an alarm condition.

* * * * *